U

United States Patent Office 2,839,490
Patented June 17, 1958

2,839,490

POLYESTER-MONOMER SOLUTIONS CATALYZED WITH ARALKYLENE OXIDES AND PROCESS FOR MAKING SAME

Leonard C. Grotz and F. Carol Gundersen, Charleston, W. Va., assignors to The Glidden Company, Cleveland, Ohio, a corporation of Ohio No Drawing. Application February 23, 1956
Serial No. 567,090

12 Claims. (Cl. 260—45.4)

This invention relates to the accelerated curing of unsaturated polyester-monomer solutions by means of aromatic vinyl oxides such as styrene oxide, and to the resulting resinous products.

According to the invention, improved resinous products are secured by treating unsaturated polyester-monomer solutions with aralkylene oxides, one or more of the latter being introduced into the polyester-monomer solutions when curing is desired. The oxides accelerate the gelling and curing of the solutions and are especially desirable for this function because they cause practically no discoloration of the cured resin and promote a two-stage cure.

Accordingly, it is one object to induce rapid gelation and curing of polyester-monomer solutions by introducing aralkylene oxide(s) in small amounts.

Another object is to provide novel cured polyester-monomer resins characterized by substantial freedom from color of the type imparted thereto by curing catalysts heretofore employed.

As is now well known, a polymerizable unsaturated polyester is prepared by reaction of a polyhydric alcohol with ethylenically unsaturated polycarboxylic acid. It is preferable to employ a dihydric alcohol and a dicarboxylic acid in order to produce a product in which there is a maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule; for example, there may be an average of eleven or more double bonds in every ten molecules of the polyester.

The polymerizable unsaturated polyester may be produced by reaction of any desired combination of polycarboxylic acid and polyhydric alcohol. For example, an unsaturated dicarboxylic acid such as maleic, fumaric, itaconic, citraconic or mesaconic acid may be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Each of such unsaturated dicarboxylic acids contains a polymerizably reactive $\Delta^{2,3}$-enedioyl group, and a polymerizable unsaturated polyester or alkyd prepared from any one of such acids contains a plurality of such polymerizably reactive $\Delta^{2,3}$-enedioyl groups. In other words, each of the acids contains a polymerizably reactive $\Delta^{2,3}$-enoyl group (i. e., a group having the structure

and such groups are contained in dioyl radicals in the polyester molecule; hence the dioyl radicals may be defined as $\Delta^{2,3}$-enedioyl radicals (e. g., butenedioyl or ethenedicarboxylyl radicals).

Instead of a single polycarboxylic acid, a mixture of polycarboxylic acids may be employed, such as a mixture of an unsaturated dicarboxylic acid with a polycarboxylic acid containing more than two acid radicals, such as citric acid. A mixture of polyhydric alcohols may be employed, such as a mixture of dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions, the infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired properties. The consistency or viscosity of the polyester varies directly with average number of acid and alcohol residues in the molecule. For example, the average number of residues in the molecule of the polyester may vary from about three to about one hundred twenty.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired inhibitor such as hydroquinone, pyrogellol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization. Modifications are numerous and include modification of the unsaturated polyester with saturated alkyd-type resins, oil-modified alkyd resins, etc. Modification is contemplated also with one or more liquid, ethylenically unsaturated monomeric materials compatible and copolymerizable with said polyester, e. g., styrene, divinyl benzene, vinyl toluene and other nuclearly-substituted styrenes; diallyl esters such as diallyl phthalate, diallyl succinate, diallyl maleate, diallyl itaconite, etc.; and other unsaturated esters such as divinyl maleate, dioctyl itaconate, dibenzyl itaconate and the like. Since the art of preparing such curable polymerizable materials and their compositions is well known (as shown by U. S. Patents Nos. 2,420,740, 2,453,665, 2,593,787, 2,409,633, 2,443,735–2,443,741, 2,450,552, 2,255,313, 2,512,410, 2,280,256, 2,453,666, 2,610,168, 2,635,089, 2,645,626 and U. S. applications Ser. No. 307,793, filed September 3, 1952, and Ser. No. 377,265, filed August 28, 1953), no extended discussion seems necessary here except to point out that many of the polyester-monomer compositions (which are 100% polymerizable) tend to polymerize more or less rapidly at room temperature, and hence are conventionally stabilized with various polymerization inhibitors. The inclusion of such inhibitors in effective amounts renders the liquid materials stable against polymerization for various periods of time, thereby enabling them to be manufactured and then stored until such time as they are to be used in making moldings, castings, coatings, etc. At such time, it has heretofore been conventional practice to add relatively small amounts to curing catalysts, e. g., benzoyl peroxide. After such catalysts have been added, the compositions tend to polymerize fairly rapidly at room temperature, and faster at higher temperatures, until they have attained a stable, cured, resinous state.

We have now discovered that aralkylene oxides such as styrene oxide, vinyl toluene oxide, divinyl benzene oxide, etc. can be used advantageously as curing catalysts for such polyester compositions. They can be used as the sole curing catalyst, or can be used in combination with peroxide or other conventional curing catalysts. We prefer, however, to use them as the sole catalyst, since we have found that in contrast with many of the conventional catalysts, the aralkylene oxides do not cause appreciable discoloration of the cured resins. The aralkylene oxides contemplated for use in the present invention have the general formula:

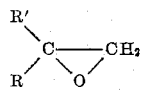

wherein R stands for a substituted or unsubstituted aromatic monocyclic radical of 6–10 carbons, and where R' represents hydrogen or a monovalent hydrocarbon radical of up to three carbons. Illustrative of aralkylene oxides having the above general formula may be mentioned styrene oxide, α-methyl styrene oxide, α-methyl paramethyl styrene oxide; nuclearly alkyl substituted styrene oxides such as ortho-, meta- or para-methyl-styrene oxide, ortho-, meta- or para-ethylstyrene oxide, ortho-, meta- or para-isopropylstyrene oxide or ortho-, meta- or para-tert-butylstyrene oxide; nuclearly halogenated styrene oxides such as ortho-, meta- or para-chlorostyrene oxide or ortho-, meta-, or para-fluoro-styrene oxide; ortho-, meta- or para-hydroxy-styrene oxide; nuclear alkoxy styrene oxides such as ortho-, meta- or paramethoxystyrene oxide, ortho-, meta- or para-ethoxystyrene oxide or ortho-, meta- or para-propoxystyrene oxide, etc.

The foregoing oxides are added in small amounts usually ranging from about ½% to about 15% by weight on the polyester-monomer solution which is to be cured. The amount needed for rapid gelation and effective curing varies of course with the particular catalyst or combination of catalysts used, with the nature of the polyester(s) and monomer(s) in the mass which is to be cured, with the nature and amount of the stabilizer(s) present in the polyester-containing mass, with the rate at which it is desired the mass shall gel and cure, and with the curing conditions employed. Thus the amount which is to be used is best determined by a few exploratory tests of the selected catalyst(s) with the selected polyester-monomer solution under the selected curing conditions.

One outstanding advantage which we have discovered attends the use of our aralkylene oxides is that the cure occurs in two stages as a result of the cure-accelerating attributes of the catalysts. Thus the polyester solution gels rapidly even at room temperature to a soft gel stage. Full curing beyond that stage can then be accelerated by heating the mass at moderately elevated temperatures (200–250° F.). This two-stage effect is very desirable in castings, for instance, since it results in low shrinkage and practically eliminates cracking and crazing. Our catalysts are also beneficial in shortening the total curing time. Thus we have found that a polyester-monomer solution which would require ten days for curing at room temperature when catalyzed with peroxide catalysts can be gelled in two hours at room temperature by using, for example, styrene oxide in place of the peroxide catalysts. Post-curing by heating at 200°–250° F. completes the cure in an additional few hours.

As previously mentioned, our catalysts can be used in combination with conventional catalysts such as peroxides to achieve a rapid exothermic cure. Such combinations are especially useful in curing moldings, films, etc.

The catalysts of our invention are readily soluble in polyester masses, thereby being easily mixed uniformly with the masses at the time when curing is desired.

The following examples illustrate the principles of our invention and the best modes presently known to us for practicing those principles.

*Example 1*

To one hundred parts of polyester A (described below) was added 1% cumene hydroperoxide plus 2 parts styrene oxide. The resulting mixture was observed to have a gel time at room temperature of seven minutes. When 1 part of cumene hydroperoxide and 5 parts of styrene oxide were mixed with one hundred parts of polyester A, the gel time at room temperature was 4 minutes. When an additional 5 parts of styrene oxide was included (total of 10 parts styrene oxide with 1 part cumene hydroperoxide) the gel time at room temperature was 4.5 minutes. The gel time at room temperature for a mixture of one hundred parts of polyester A with 1 part of cumene hydroperoxide was 4.5 hours.

*Example 2*

With one hundred parts of polyester B (described below) was mixed one part of cumene hydroperoxide and 0, 2, 5 and 10 parts of styrene oxide. The following table indicates the observed gel time of the various mixtures at room temperature.

| Cumene hydroperoxide | 1 part | 1 part | 1 part | 1 part. |
|---|---|---|---|---|
| Styrene oxide | none | 2 parts | 5 parts | 10 parts. |
| Gel time | 3 days | 90–210 min | 67 min | 56 min. |

The peak exotherm (highest temperature attained in a polyester mass while undergoing curing) and gel time were determined for mixtures of 1, 2, 5 and 10 parts of styrene oxide with 100 parts of polyester B, as shown in the following table:

| Styrene oxide, Exotherm at 180° F. | 1 part | 2 parts | 5 parts | 10 parts |
|---|---|---|---|---|
| Peak (° F.) | 195 | 201 | 209 | 220 |
| Total time (minutes) | 8 | 8 | 16.75 | 16 |
| Gel Time at R. T. (hrs.) | 3.5 | 2 | 1.5 | 1.5 |
| Gel Time at 160° F. (Seconds) | 565 | 440 | 356 | 206 |

These results clearly show the catalytic effect of the styrene oxide.

In order to determine that the catalytic effect of styrene oxide was not caused by foreign material, some styrene oxide was fractionally distilled by using a Vigreaux column and including in the distilling flask a piece of iron wire. Inspection of the iron wire after distillation of the material indicated that no peroxides were present. The fractions were secured from 800 ml. of styrene oxide as shown here:

| Fraction | Temp. at Dist. Head, ° C. | Total Volume (ml.). |
|---|---|---|
| I | | 11 |
| II | 191.0 | 61 |
| III | 191.2 | 161 |
| IV | 191.3 | 261 |
| V | 191.9 | 360 |
| VI | 192.0 | 460 |
| VII | 192.0 | 560 |
| VIII | 192.4 | 660 |
| IX | 193.0 | ¹ 740 |
| X | 193 | 800 |

¹ Approximate.

Fractions II and VI were tested five days after distillation and fractions I–IX were tested 110 days after distillation. The tests were made by mixing 5 parts of a fraction with 100 parts of polyester B and observing either gel time at room temperature or exothermicity at 180° F., or both. A control run using undistilled styrene oxide was also included.

One half inch thick castings were made from 100 parts of polyester B with 5 parts of the various fractions and (for control purposes) with 5 parts of the undistilled styrene oxide. These were baked one-half hour at 150° F. plus 1 hour at 200° F. Barcol hardness readings on the castings were as follows:

| Fraction | Hardness |
|---|---|
| I | 40 |
| II | 46 |
| III | 44 |
| IV | 42 |
| V | 42 |
| VI | 47 |
| VII | 41 |
| VIII | 40 |
| IX | 38 |
| X | 0 |
| Undistilled Styrene Oxide | 40–44 |

*Example 3*

Various polyesters were tested for gel time at room temperature when catalyzed with 5% styrene oxide. For the sake of comparison, other catalysts are also shown in the following tabulation:

| Polyester | 1% Benzoyl Peroxide | 0.5% TBH¹ (hours) | 5% Styrene Oxide |
|---|---|---|---|
| A | 31–36 hours | 2.5–3.5 | 16 hours. |
| B | 10 days | | 1.5 hours. |
| C | 4–5 days | 4–5 | 7 hours. |
| D | 12–14 days | | 13 hours. |
| E | 30–48 hours | 3.5–4 | 13–21 hours. |
| F | 2–4 days | | 2 hrs., 40 min. |
| G | 20–24 hours | 8–10 | 5 minutes. |
| H | 40 hours | 15 | 41 minutes. |

¹ Tertiary butyl hydroperoxide.

*Example 4*

Five percent of the following catalysts were mixed with polyesters A and B and gel time at room temperature was measured.

| Catalyst | | Gel Time | |
|---|---|---|---|
| | | Polyester A | Polyester B |
| No addition | months | 6 | 6 |
| Allyl glycidyl ether | days | 20 | 110 |
| Phenyl glycidyl ether | do | 20 | 45 |
| Epichlorohydrin | do | 110 | 105 |
| Propylene oxide | do | | 120 |
| Glycidol | do | | 90 |
| Styrene oxide | hours | 16 | 1½ |

*Examples 5–11*

Polyesters containing combined halogen yield much faster gel times when catalyzed with styrene oxide.

| | 5 | 6 | 7 | 8 | 9 | 10 | 11 |
|---|---|---|---|---|---|---|---|
| Polyester B (no chlorine) | 100 g | 100 g | 100 g | | | | 90. |
| Polyester G (contains Cl) | | | | 100 g | 100 g | 100 g | 10. |
| Styrene Oxide | | 2% | 5% | | 2% | 5% | 2%. |
| Cumene Hydroperoxide | 1 cc | 1 cc | 1 cc | 1 cc | 1 cc | 1 cc | 1 cc. |
| Gel time at R. T. | 3 da | 2 hrs | 67 min | 4½ hrs | 7 min | 4 min | 24 min. |

*Example 12*

Exotherm tests have been performed at 180° F. on polyester B catalyzed with 1% benzoyl peroxide and varying amounts of styrene oxide. The exotherm test was determined as follows: The resin was poured in a test tube 19 by 55 mm. to a depth of three inches and the tube was suspended in a 180° F. water bath. A needle thermocouple was guided to the center of the resin approximately 1½ inches from the bottom of the tube. The thermocouple was connected to a recording potentiometer which recorded the exothermic heat evolved during polymerization. The peak exotherm is the maximum temperature reached by the resin; the reaction time is the elapsed time from 150° F. to peak exotherm.

| Sample | Percent Styrene Oxide | Percent Benzoyl Peroxide | Exothermic Peak, ° F. | Total Reaction Time, minutes | Gel Time at Room Temp. |
|---|---|---|---|---|---|
| I | 0 | 1 | 420 | 6 | 11 days. |
| II | 0.01 | 1 | 420 | 6 | 11 days. |
| III | 0.1 | 1 | 424 | 5½ | 4 days. |
| IV | 1.0 | 1 | 424 | 3½ | 2 hours. |
| V | 2.0 | 1 | 428 | 2¾ | 1¼ hours. |
| VI | 5.0 | 1 | 430 | 3⅛ | ¾ hour. |
| VII | 15.0 | 1 | 400 | 4⅜ | 1¼ hours. |

It is evident that styrene oxide is an excellent accelerator for polyesters at elevated temperatures. No darkening of the resin was experienced in any of the above exotherm tests.

*Example 13*

100 parts of polyester B was catalyzed with 5% styrene oxide. This catalyzed mixture was used to mold a 3 inch diameter circular disc (thickness 1/16 in.) reinforced with glass fiber mat in a hydraulic molding press having a heated die. Temperature of the die was 240° F. Two plies of 2 ounce Owens-Corning Fiberglas mat were placed in the die and a small amount of the catalyzed resin was poured over them. The press was closed to exert approximately 100 p. s. i. on the molding. After a ten minute cure cycle the disc was cured. It exhibited a Barcol hardness of 30.

For more rapid curing polyester B was catalyzed with 3.75% styrene oxide and 1.25% benzoyl peroxide and used to mold another disc. However, the mold temperature was at 200° F. and cure time was 60 seconds. This short cycle and lower temperature produced a cured specimen.

*Example 14*

When the styrene oxide of Example 3 was replaced with vinyl toluene oxide, with para chlorostyrene oxide, para hydroxystyrene oxide, para methoxystyrene oxide or with α-methyl styrene oxide on a weight for weight basis, substantially the same results were secured.

| Polyester | Components |
|---|---|
| A | Propylene glycol, maleic anhydride, phthalic anhydride and styrene, stabilized with choline chloride as per copending application Serial No. 377,265, supra, and with 4-t-butyl catechol. |
| B | Propylene glycol, maleic anhydride, phthalic anhydride, styrene and hydroquinone. |
| C | Propylene glycol, alpha allyl ether of glycerine (as per copending application Ser. No. 307,703, supra), maleic anhydride, phthalic anhydride, styrene choline chloride, quinone and manganese naphthenate. |
| D | Propylene glycol, fumaric acid, phthalic anhydride, styrene, hydroquinone. |
| E | Diethylene glycol, maleic anhydride, adipic acid, styrene, 4-t-butyl catechol, chlorine chloride. |
| F | Propylene glycol, alpha allyl ether of glycerine, maleic anhydride, phthalic anhydride, styrene, hydroquinone, chlorine chloride, quinone, cobalt and manganese naphthenate. |
| G | Propylene glycol, maleic anhydride, tetrachlorophthalic acid, hydroquinone and styrene. |
| H | Propylene glycol, maleic anhydride, phthalic anhydride, vinyl toluene stabilized with choline chloride as per copending application Ser. No. 377,265, supra, and with 4-t-butyl catechol. |

*Example 15*

Exotherm tests at 180° F. were conducted in the manner described in Example 12, but using a polymer-monomer combination in which the polyester was a propylene glycol, maleic anhydride, phthalic anhydride reaction product and in which the copolymerizable monomer was diallyl phthalate. The polyester-monomer combination was stabilized with 4-tertiary-butyl catechol and with choline chloride.

The following data was secured, showing the effective use of styrene oxide as a gelation accelerator:

| Sample | Percent Styrene Oxide | Percent Benzoyl Peroxide | Exothermic Peak, °F. | Total Reaction Time, minutes | Gel Time at Room Temp., days |
|---|---|---|---|---|---|
| I | 0 | 1 | 345 | 14¼ | 10 |
| II | 0.01 | 1 | 347 | 14½ | 8 |
| III | 0.1 | 1 | 346 | 12½ | 3 |
| IV | 1.0 | 1 | 344 | 11 | 4 |
| V | 5.0 | 1 | 304 | 12¼ | 2 |
| VI | 10.0 | 1 | 254 | 12¾ | 2 |
| VII | 15.0 | 1 | 226 | 14 | 3 |

Having described our invention, what we claim is:

1. The method of accelerating the gelation and cure of a 100% polymerizable liquid mixture whose principal polymerizable components are composed essentially of a homogeneous solution of (a) unsaturated alkyd resin whose molecules contain a plurality of polymerizably-reactive Δ²,³-enedioyl groups and (b) copolymerizable ethylenically-unsaturated liquid monomeric material, said method comprising the step of adding to said polymerizable liquid mixture a small effective amount around 0.5% up to 15% by weight thereon of at least one organic oxide having the general formula

wherein R is a monocyclic aromatic radical of up to 10 carbons in which the R—C bond extends to a carbon atom of the ring of said radical, and wherein R' is selected from the group consisting of hydrogen and aliphatic hydrocarbon radicals having up to 3 carbons.

2. The method as claimed in claim 1 wherein said organic oxide is styrene oxide.

3. The method as claimed in claim 2 wherein the ethylenically-unsaturated copolymerizable monomeric material of said homogeneous solution is a material having up to two vinyl radicals attached to separate carbon atoms in the ring of a monocyclic aromatic hydrocarbon containing up to 7 carbons.

4. The method as claimed in claim 3 wherein the ethylenically-unsaturated monomeric material of said homogeneous solution is styrene.

5. The method as claimed in claim 3 wherein the ethylenically-unsaturated monomeric material of said homogeneous solution is vinyl toluene.

6. The method as claimed in claim 2 wherein the ethylenically-unsaturated monomeric material of said homogeneous solution is at least one diallyl ester of a dicarboxylic acid.

7. A polymerizable composition adapted to gel rapidly at room temperatures and to be subsequently cured at elevated temperatures without being darkened in color, said composition comprising as its principal liquid vehicle a homogeneous 100% polymerizable solution composed essentially of: (a) unsaturated alkyd resin whose molecules contain a plurality of polymerizably-reactive Δ²,³-enedioyl groups, (b) copolymerizable ethylenically-unsaturated liquid monomeric material, and (c) a catalyst component comprising a small effective amount around 0.5% up to 15% by weight on the total weight of (a) plus (b) of at least one organic oxide having the general formula

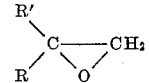

wherein R is a monocyclic aromatic radical of up to 10 carbons in which the R—C bond extends to a carbon atom of the ring of said radical, and wherein R' is selected from the group consisting of hydrogen and aliphatic hydrocarbon radicals having up to 3 carbons.

8. A composition as claimed in claim 7 wherein said organic oxide is styrene oxide.

9. A composition as claimed in claim 8 wherein the copolymerizable ethylenically-unsaturated monomeric material of said vehicle is material having up to two vinyl radicals attached to separate carbon atoms in the ring of a monocyclic aromatic hydrocarbon containing up to 7 carbon atoms.

10. A composition as claimed in claim 9 wherein the ethylenically-unsaturated monomeric material of said vehicle is styrene.

11. A composition as claimed in claim 9 wherein the ethylenically-unsaturated monomeric material of said vehicle is vinyl toluene.

12. A composition as claimed in claim 8 wherein the ethylenically-unsaturated monomeric material of said vehicle is at least one diallyl ester of a dicarboxylic acid.

References Cited in the file of this patent

UNITED STATES PATENTS

| 1,988,529 | Werntz | Jan. 22, 1935 |
| 2,255,313 | Ellis | Sept. 9, 1941 |